United States Patent [19]

Blum et al.

[11] Patent Number: 5,387,642

[45] Date of Patent: Feb. 7, 1995

[54] AQUEOUS BINDER COMPOSITION AND A PROCESS FOR ITS PREPARATION

[75] Inventors: Harald Blum, Wachtendonk; Werner Kubitza, Leverkusen; Peter Höhlein, Kempen, all of Germany

[73] Assignee: Bayer Aktiengesellschaft, Leverkusen, Germany

[21] Appl. No.: 7,219

[22] Filed: Jan. 22, 1993

Related U.S. Application Data

[63] Continuation-in-part of Ser. No. 820,172, Jan. 13, 1992, abandoned.

[30] Foreign Application Priority Data

Jan. 19, 1991 [DE] Germany ............... 4101527
Apr. 9, 1991 [DE] Germany ............... 4111392

[51] Int. Cl.$^6$ .................. C08J 3/20; C08K 3/20; C08L 51/00; C08L 67/00
[52] U.S. Cl. .................. 524/591; 524/539; 524/839; 524/840; 427/372.2
[58] Field of Search ............ 524/839, 840, 591; 427/372.2

[56] References Cited

U.S. PATENT DOCUMENTS 4,608,413  8/1986  Nachtkamp et al. ......... 524/591
4,945,128  7/1990  Hille et al. ................. 524/591
5,004,779  4/1991  Blum et al. ................. 524/591

FOREIGN PATENT DOCUMENTS 1601033  10/1981  United Kingdom .

*Primary Examiner*—Paul R. Michl
*Assistant Examiner*—Patrick Niland
*Attorney, Agent, or Firm*—Joseph C. Gil; Thomas W. Roy

[57] ABSTRACT

This invention relates to an aqueous binder composition containing
  A) an aqueous solution or dispersion of an organic polyol component which can be diluted with water and contains at least one polyester resin containing urethane, carboxylate and hydroxyl groups and
  B) a polyisocyanate component which has a viscosity of 50 to 10,000 mPa.s at 23° C. and contains at least one organic polyisocyanate which is present as an emulsion in component A), wherein the NCO/OH equivalent ratio, based on the isocyanate groups of component B) and the hydroxyl groups of the polyol component present in A), is 0.5:1 to 5:1.

The invention also relates to a process for the preparation of these coating compositions by emulsifying a polyisocyanate component having a viscosity of 50 to 10,000 mPa.s at 23° C. and containing at least one organic polyisocyanate in an aqueous solution or dispersion of a polyester resin containing urethane, carboxylate and hydroxyl groups in an sufficient to provide an an NCO/OH equivalent ratio, based on the isocyanate groups of the polyisocyanate component and the hydroxyl groups of the polyester resin, of 0.5:1 to 5:1.

22 Claims, No Drawings

AQUEOUS BINDER COMPOSITION AND A PROCESS FOR ITS PREPARATION

This application is a continuation-in-part of application Ser. No. 07/820,172, filed Jan. 13, 1992 now abandoned.

BACKGROUND OF THE INVENTION

1. Field of the Invention

This invention relates to an aqueous binder composition based on polyisocyanates and water soluble or water dispersible polyester resins containing urethane, carboxylate and hydroxyl groups and polyisocyanates and to a process for the preparation of such binder compositions.

2. Description of the Prior Art

Two-component polyurethane coating compositions are known and are very important for use as coatings due to their excellent properties but they have the disadvantage that their processing requires substantial quantities of organic solvents which must subsequently be removed, e.g., by burning. In many fields of application, especially those which are non-industrial, the disposal of the organic solvents cannot be carried out and the demand is therefore even greater for coating compositions which have a high solids content and above all are dilutable with water in order to reduce the release of solvents and, thus, environmental pollution as much as possible.

The use of water as the liquid phase in two-component polyurethane lacquers having free isocyanate groups is normally not possible since isocyanate groups react not only with alcoholic hydroxyl groups but also with water to form urea and carbon dioxide. The pot life, the processing time and the quality of the resulting coatings are thereby generally reduced to a level which is not acceptable in practice.

One possible solution is described in DE-OS 3,829,587, in which the selected polyhydroxypolyacrylates are combined with polyisocyanates containing free isocyanate groups to form aqueous two-component systems.

It has now surprisingly found that special aqueous polyester resins containing urethane, carboxylate and hydroxyl groups may also be used together with polyisocyanates containing free isocyanate groups in aqueous two-component binders.

SUMMARY OF THE INVENTION

This invention relates to an aqueous binder composition which may be cured by an isocyanate addition reaction on a coated substrate containing A) an aqueous solution or dispersion of an organic polyol component which can be diluted with water and contains at least one polyester resin containing urethane, carboxylate and hydroxyl groups and B) a polyisocyanate component which has a viscosity of 50 to 10,000 mPa.s at 23° C. and contains at least one organic polyisocyanate which is present as an emulsion in component A), wherein the NCO/OH equivalent ratio, based on the isocyanate groups of component B) and the hydryoxl groups of the polyol component present in A), is 0.5:1 to 5:1.

The invention also relates to a process for the preparation of these coating compositions by emulsifying a polyisocyanate component having a viscosity of 50 to 10,000 mPa.s at 23° C. and containing at least one organic polyisocyanate in an aqueous solution or dispersion of a polyester resin containing urethane, carboxylate and hydroxyl groups in an sufficient amount to provide an NCO/OH equivalent ratio, based on the isocyanate groups of the polyisocyanate component and the hydroxyl groups of the polyester resin, of 0.5:1 to 5:1.

DETAILED DESCRIPTION OF THE INVENTION

Component A) is based on at least one polyester resin containing urethane, carboxylate and hydroxyl groups and preferably having a weight average molecular weight ($M_w$, determined by gel permeation chromatography using calibrated polystyrene as the standard) of 3000 to 100 000, preferably 6000 to 50 000; a hydroxyl number of 20 to 240, preferably 45 to 190 mg KOH/g; an acid number (based on all the carboxyl groups, 25 to 100%, preferably 40 to 100%, of which are present in carboxylate form) of 10 to 45, preferably from 14 to 33 mg KOH/g; and a urethane group content (—N-H—CO—O—) of 2.5 to 15.0, preferably 5.0 to 12.5% by weight. The values for the hydroxyl number, the acid number and the urethane group content are based on the solids of component A).

For the preparation of the binder composition according to the invention, component A) is generally used in the form of a 15 to 65% by weight, preferably 25 to 55% by weight, aqueous solution or dispersion which has a viscosity of 10 to 30,000, preferably 50 to 10,000 mPa.s at 23° C. and a pH value of 5 to 10, preferably 6 to 9.

The polyester resins containing urethane, carboxylate and hydroxyl groups may be generally present in component A) as solutions or dispersions, depending upon their molecular weight, the carboxyl group or carboxylate group content and the nature of the neutralizing agent and the optional auxiliary solvents. As a general rule both dissolved and dispersed components are present.

The polyester resins containing urethane, carboxylate and hydroxyl groups are prepared in known manner by reacting a) 65 to 92% by weight, preferably 70 to 87% by weight, of a polyester polyol having a hydroxyl number of 50 to 500, preferably 80 to 350 mg KOH/g and an acid number $\leq 6$, preferably $\leq 4$ mg KOH/g, b) 0 to 7% by weight, preferably from 0 to 3% by weight, of a diol having a molecular weight of 62 to 240, c) 2.5 to 7.5% by weight, preferably 3.0 to 6.5% by weight, of 2,2-bis-(hydroxymethyl)-alkane carboxylic acid which may be present in the form of a tertiary amine salt and d) 8 to 30% by weight, preferably 10 to 23% by weight, of at least one polyisocyanate having two or more isocyanate groups and a molecular weight of 166 to 2000, wherein the percentages add up to 100%. The polyester resins may be present as a 40 to 99% organic solution or they may be solvent free, i.e., at a concentration of 100%. To prepare the polyester resin, components a), b) and c) are introduced into a reaction vessel together with an organic solvent and reacted with component d) at a temperature of 40 to 140° C. in the presence of up to 2.5% by weight of suitable catalysts until virtually no free isocyanate groups can be detected after the reaction. The reaction mixture is then dispersed or dissolved in water and 25 to 100% of the carboxyl groups which have been introduced into the reaction product are converted into carboxylate groups by the addition of the base either during the reaction or before or after the step of dispersion or solution. The organic solvent is optionally partially or completely removed from the reaction mixture by distillation before, during or after preparation of the dispersion or solution.

The polyester polyols a) are prepared by the polycondensation of a$_1$) 0 to 60% by weight of at least one monocarboxylic acid having 6 to 22 carbon atoms, a$_2$) 10 to 65% by weight of di- and/or tricarboxylic acids or their anhydrides, a$_3$) 15 to 70% by weight of di- and/or higher functional alcohols, a$_4$) 0 to 30% by weight of monohydric alcohols and a$_5$) 0 to 25% by weight of hydroxycarboxylic acids, lactones, aminoalcohols and/or aminocarboxylic acids, wherein the percentages of a$_1$) to a$_5$) add up to 100%. The reaction is preferably carried out solvent free or using azeotropic condensation at temperatures of 140° to 240° C. with elimination of water and optionally with the aid of conventional esterification catalysts.

Starting component a$_1$) is based on at least one monocarboxylic acid having a molecular weight of 112 to 340. Examples of suitable monocarboxylic acids include benzoic acid, tert-butylbenzoic acid, hexahydrobenzoic acid, saturated fatty acids such as 2-ethylhexanoic acid, isononanoic acid, coconut oil fatty acid, hydrogenated commercial fatty acids and fatty acid mixtures, decanoic acid, dodecanoic acid, tetradecanoic acid, stearic acid, palmitic acid, docosanoic acid, unsaturated fatty acids such as soya bean oil fatty acid, castor oil fatty acid, sorbic acid, ground nut oil fatty acid, conjuenic fatty acid, tall oil fatty acid, safflower oil fatty acid and mixtures of these or other monocarboxylic acids.

Starting component a$_2$) is based on di- and/or tricarboxylic acids or their anhydrides having a molecular weight of 98 to 600. Examples include phthalic acid (anhydride), isophthalic acid, terephthalic acid, tetrahydrophthalic acid (anhydride), hexahydrophthalic acid (anhydride), maleic acid (anhydride), succinic acid (anhydride), fumaric acid, adipic acid, sebacic acid, azelaic acid, dimeric fatty acids, trimeric fatty acids, trimellitic acid (anhydride) and mixtures of these or other acids.

Starting component a$_3$) is based on diols, triols, tetrols and higher functionality alcohol components having a molecular weight of 62 to 400. Examples include ethylene glycol, 1,2 and 1,3- propylene glycol, 1,3-, 1,4- and 2,3-butanediol, 1,6-hexanediol, 2,5-hexanediol, trimethylhexanediol, diethylene glycol, triethylene glycol, hydrogenated bisphenols, 1,4-cyclohexane diol, 1,4-cyclohexane dimethanol, neopentyl glycol, tricyclodecane diol, trimethylolpropane, glycerol, pentaerythritol, trimethylpentane diol, dipentaerythritol and mixtures of these or other polyvalent alcohols. Starting component a$_4$) is based on monohydric alcohols having a molecular weight of 100 to 290 such as n-hexanol, cycohexanol, decanol, dodecanol, tetradecanol, octanol, octadecanol, natural fatty alcohol mixtures such as Ocenol 110/130 (available from Henkel) and mixtures of these and other alcohols.

Starting component a$_5$) is based on hydroxycarboxylic acids, lactones, aminoalcohols and/or aminocarboxylic acids, e.g., dimethylolpropionic acid, lactic acid, maleic acid, tartaric acid, e caprolactone, aminoethanol, aminopropanol, diethanolamine, aminoacetic acid and aminohexanoic acid.

Preferred polyester polyols a) contain a$_1$) 0 to 55% by weight of monocarboxylic acids having 7 to 20 carbon atoms such as benzoic acid, 2-ethylhexanoic acid, isononaoic acid, hydrogenated commercial fatty acids or mixtures thereof (such as Prifrac 2950, Prifrac 2960 and Prifrac 2980, which are available from Unichema International), stearic acid, palmitic acid, ground nut oil fatty acid and/or soya oil fatty acid, a$_2$) from 15 to 56% by weight of di- and/or tricarboxylic acids or their anhydrides such as phthalic acid anhydride, hexahydrophthalic acid anhydride, isophthalic acid, maleic acid anhydride, terephthalic acid, fumaric acid, adipic acid, benzene tricarboxylic acid and/or dimeric fatty acids, and a$_3$) from 25 to 63% by weight of difunctional and/or higher functional alcohols such as ethylene glycol, 1,2-propylene glycol, 1,6-hexanediol, 1,4-cyclohexane-dimethanol, neopentylglycol, trimethylolpropane, glycerol and/or pentaerythritol.

When esterification takes place azeotropically, the entraining agent, which is normally isooctane, xylene, toluene or cyclohexane, is distilled under vacuum after the reaction.

Component b) is based on at least one diol having a molecular weight of 62 to 240, preferably neopentyl glycol, 1,4-cyclohexanedimethanol, 1,6-hexanediol and/or ethylene glycol.

Component c) is based on at least one 2,2-bis-(hydroxy-methyl)-alkanecarboxylic acid having a total of at least five carbon atoms, preferably 2,2-bis-(hydroxymethyl)-propionic acid (dimethylolpropionic acid) or a t-amine salt of such an acid, for example the triethylene salt of dimethylolpropionic acid.

Component d) is based on at least one polyisocyanate having at least two isocyanate groups and having a molecular weight of 168 to 2000. Examples include hexamethylene diisocyanate, perhydro-2,4- and -4,4-diphenylmethane diisocyanate, isophorone diisocyanate, toluene diisocyanate, naphthalene diisocyanate and other isocyanates such as those described e.g. in "Methoden der Organischen Chemie" (Houben-Weyl, Vol 14/2, 4th Edition, Georg Thieme Verlag Stuttgart 1963, pages 61-70).

Other suitable polyisocyanates include polyisocyanate adducts prepared from on hexamethylenediisocyanate, isophorone diisocyanate and tolylene diisocyanate and containing, for example, urethane groups, uretdione groups, isocyanurate groups and/or biuret groups. Mixtures of the above-mentioned polyisocyanates as well as of other polyisocyanates are also suitable.

Preferred polyisocyanates include hexamethylene diisocyanate, isophorone diisocyanate, perhydro-2,4'- and -4,4-diphenylmethane diisocyanate and polyisocyanate adducts prepared from hexamethylenediisocyanate such as those mentioned hereinafter in the description of component B).

Examples of suitable organic solvents for the preparation of the polyester resins containing urethane, carboxylate and hydroxyl groups include N-methylpyrrolidone, diethylene glycol dimethylether, methylethyl ketone, methylisobutyl ketone, acetone, xylene, toluene, butyl acetate and mixtures of these or other solvents which are not isocyanate reactive. The organic solvents may be completely or partly removed from the reaction mixture before, during or after the step of dispersion, either azeotropically and/or by the application of a vacuum or a stream of inert gas.

Examples of suitable catalysts for the urethanization reaction include tertiary amines such as triethylamine, tin-II-octoate, dibutyl tin oxide, dibutyl tin dilaurate and other known catalysts.

Before or during the dispersion step, 25 to 100%, preferably 40 to 100%, of the incorporated carboxyl groups are converted into carboxylate groups by the addition of at least one base if these salts were not directly used as component c).

Examples of suitable bases include ammonia, N-methylmorpholine, triethylamine, dimethylethanolamine, methyldiethanolamine, triethanolamine, morpholine, tripropylamine, ethanolamine, triisopropanolamine, 2-amino-2-methyl-1-propanol and mixtures of these and other neutralizing agents. Sodium hydroxide, lithium hydroxide and potassium hydroxide are also suitable neutralizing agents but are less preferred. Ammonia and dimethylethanolamine are preferred neutralizing agents.

Small quantities of other organic solvents such as ethanol, propanol, butanol, butyl glycol, hexanol, octanol, butyl diglycol, ethyl diglycol, methyl diglycol and methoxy propanol may be added after the urethanization reaction for obtaining certain properties.

For the dispersing step the mixture of water and neutralizing agents may be added to the resin; water may be added to the mixture of resin and neutralizing agent; the resin may be added to the mixture of water and neutralizing agent; or the mixture of resin and neutralising agent may be added to the water. The dispersibility of the resins in water may be improved, if desired, by the addition of external emulsifiers such as ethoxylated nonylphenol, during the dispersion process.

Dispersion is normally carried out at 40° to 120° C. The aqueous binder component A) containing urethane, carboxylate and hydroxyl groups has a solids contents (which corresponds to the amount of dissolved and/or dispersed polyester resins) of 25 to 65% by weight, preferably 30 to 55% by weight. The proportion of organic solvents is <8%, preferably <6% and more preferably <1.5% by weight.

Polyisocyanate component B) may be any organic polyisocyanate which has aliphatically, cycloaliphatically, araliphatically and/or aromatically bound free isocyanate groups and is liquid at room temperature. Polyisocyanate component B) has a viscosity at 23° C. of 50 to 10,000 mPa.s, preferably 50 to 1000 mPa.s. More preferably, polyisocyanate component B) is based on polyisocyanates or polyisocyanate mixtures exclusively containing aliphatically and/or cycloaliphatically bound isocyanate groups and having an (average) NCO functionality of 2.2 to 5.0 and a viscosity at 23° C. of 50 to 500 mPa.s.

If necessary, the polyisocyanates may be added in the process as mixtures with small quantities of inert solvents in order to reduce the viscosity to a value within the stated ranges. However, such solvents should be used in an amount such that the coating compositions obtained according to the invention contain at most 20% by weight of solvent, based on the quantity of water and including any solvent present in the polyester dispersions or solutions.

Suitable solvents used as additives for the polyisocyanates include aromatic hydrocarbons such as "solvent naphtha" or the solvents previously described.

Preferred polyisocyanates include adducts prepared from hexamethylene diisocyanate, 1-isocyanato-3,3,5-trimethyl-5-isocyanatomethyl-cyclohexane (IPDI) and/or bis-(isocyanatocyclohexyl)-methane, more preferably those based exclusively on hexamethylene diisocyanate. The polyisocyanate adducts contain biuret, urethane, uretdione and/or isocyanurate groups and contain less than 0.5% by weight of excess starting diisocyanate, which preferably has been removed by distillation. The preferred aliphatic polyisocyanates to be used according to the invention include biuret group-containing polyisocyanates prepared from hexamethylene diisocyanate in accordance with, e.g., U.S. Pat. Nos. 3,124,605, 3,358,010, 3,903,126, 3,903,127 and 3,976,622, which are herein incorporated by reference. These polyisocyanates contain mixtures of N,N',N''-tris-(6-isocyanatohexyl)-biuret with minor quantities of its higher homologues. Also preferred are isocyanurate group-containing polyisocyanates prepared from hexamethylene diisocyanate in accordance with U.S. Pat. No. 4,324,879 (herein incorporated by reference) and containing N,N',N''-tris-(6-isocyanatohexyl)-isocyanurate in admixture with minor quantities of its higher homologues.

More preferred are mixtures of uretdione group-containing and isocyanurate group-containing polyisocyanates prepared from hexamethylene diisocyanate which may be obtained by the catalytic oligomerization of hexamethylene diisocyanate in the presence of trialkyl phosphines. Mixtures of this type which have a viscosity of 50 to 500 mPa.s at 23° C. and an isocyanate functionality of 2.2 to 5.0 are most preferred.

Aromatic polyisocyanates which are also suitable, but less preferred, include polyisocyanate adducts prepared from 2,4-diisocyanatotoluene or mixtures thereof with 2.4-diisocyanatotoluene or prepared from 4,4'-diisocyanato-diphenylmethane or mixtures thereof with its isomers and/or higher homologues. Aromatic polyisocyanate adducts of this type include the polyisocyanates containing urethane groups and obtained by the reaction of excess quantities of 2,4-diisocyanatotoluene with polyhydric alcohols such as trimethylolpropane followed by distillation to remove excess unreacted diisocyanate. Other aromatic polyisocyanate adducts include the isocyanurate group-containing polyisocyanates prepared from the monomeric diisocyanates previously described.

It is also possible to use unmodified polyisocyanates of the type exemplified above if they conform to the previously discussed requirements concerning viscosity. Polyisocyanate component B) may also be based on mixtures of the polyisocyanates previously described.

The polyisocyanates according to the invention may be either hydrophobic or hydrophilic. Hydrophilic polyisocyanates are those which contain chemically incorporated ionic groups and/or ethylene oxide units (non-ionic groups) incorporated within terminal and/or lateral polyether chains in an amount sufficient to maintain the polyisocyanate stably dispersed in water. Hydrophobic polyisocyanates, which are preferred in accordance with the present invention, are those which do not contain the previously mentioned hydrophilic groups in an amount sufficient to maintain the polyisocyanate stably dispersed in water. Preferably, the hydrophobic polyisocyanates do not contain any hydrophilic groups. Examples of these preferred hydrophobic polyisocyanates are the unmodified polyisocyanates and polyisocyanate adducts previously set forth.

The hydrophilic polyisocyanates have a content of chemically incorporated nonionic groups of 0 to 25% by weight, preferably 2 to 25% by weight, more preferably 5 to 20% by weight and most preferably 7 to 15% by weight of hydrophilic ethylene oxide units (calculated as —CH$_2$—CH$_2$—O—) incorporated in lateral or terminal polyether chains, and a content of chemically incorporated anionic groups of 0 to 200 milliequivalents per 100 g of solids, based on the weight of the water dispersible polyisocyanate. When anionic groups are used, they are preferably incorporated into the water dispersible polyisocyanate in an amount sufficient to provide an anionic group content of least 10, more preferably at least 20 milliequivalents per 100 g of solids, based on the weight of the water dispersible polyisocyanate. The upper limit for the content of the anionic groups is preferably 180, more preferably 100 milliequivalents per 100 g of solids, based on the weight of the water dispersible polyisocyanate.

Suitable hydrophilic groups and methods for preparing the hydrophilic polyisocyanates are known and described in U.S. Pat. Nos. 4,408,008 and 4,663,377, the disclosures of which are herein incorporated by reference. Preferred hydrophilic groups are non-ionic hydrophilic groups incorporated by reacting the previously mentioned polyisocyanates with monofunctional, preferably monohydroxy, polyethers containing ethylene oxide units.

For the preparation of the aqueous binder compositions, polyisocyanate component B) is emulsified in aqueous binder component A). The dissolved or dispersed polyester resin functions as emulsifier for the added polyisocyanate although this function may be assisted by the addition of external emulsifiers or by the use of hydrophilic polyisocyanates.

Preparation may be carried out by simply stirring at room temperature. The quantity of polyisocyanate component used is selected to provide an NCO/OH equivalent ratio, based on the isocyanate groups of component B) and the alcoholic hydroxyl groups of component A), of 0.5:1 to 5:1, preferably 0.8:1 to 2:1.

The known auxiliary agents and additives used in coatings technology may be incorporated in polyester resin component A), i.e., in the dispersion or solution of polyester resins, before the addition of polyisocyanate component B). These auxiliary agents and additives include defoamants, thickeners, levelling agents, pigments and dispersing aids for the distribution of pigments.

The preparation of the coating compositions is preferably carried out by a multi-stage process in which a polyester resin containing urethane, carboxylate and hydroxyl groups, having a molecular weight ($M_w$) of 3000 to 100,000, a hydroxyl number of 20 to 240, an acid number of 10 to 45 and a urethane group content of 2.5 to 15.0% by weight is initially prepared by reacting at 40 to 140° C. in a 40 to 99% by weight organic solution:

a) 65 to 92% by weight of a polyester polyol having a hydroxyl number of 50 to 500 and an acid number ≦6, b) 0 to 7% by weight of a diol having a molecular weight of 62 to 240, c) 2.5 to 7.5% by weight of a 2,2-bis-(hydroxymethyl)-alkanecarboxylic acid which may be present in the form of a tertiary amine salt and d) 8 to 30% by weight of at least one at least one polyisocyanate having two or more isocyanate groups and a molecular weight of 166 to 2000, dissolving or dispersing the resulting polyester resin in water in a second reaction step and converting 25 to 100% of the carboxyl groups into carboxylate groups by neutralization before and/or during this step, optionally partially or completely removing any organic solvent used from the reaction mixture by distillation before, during and/or after the preparation of the aqueous solution or dispersion and, finally, in a third reaction step, emulsifying the polyisocyanate component in the resulting aqueous solution or dispersion of the polyester resin, optionally after the addition of auxiliary agents and additives.

The coating compositions obtained according to the invention are suitable for all applications in which solvent-containing, solvent free or other types of aqueous paints and coating systems with superior properties are required. Examples include the coating of mineral surfaces of building materials, such as plasters bound with lime and/or cement, surfaces containing gypsum, fibercement building materials, and concrete; the coating and sealing of wood and materials based on wood, such as chipboard, wood fiberboard and paper; the coating of metallic surfaces; the coating of road surfaces containing asphalt or bitumen; and the coating and sealing of various plastics surfaces. The coating compositions are also suitable for bonding together the surfaces of various materials, which may be identical or different from one another. The coating compositions to be produced and used according to the present invention cover a wide variety of products such as primers, fillers and pigmented or transparent topcoats used for single or series application in industrial coatings and coating compositions used for the initial coating or repair coating of motor vehicles.

The coatings may be applied in particular by a variety of spraying processes such as compressed air, airless or electrostatic spraying, using single component or two-component spraying apparatus.

The preparation of the coating compositions may be carried out not only some time in advance of their intended use, as described above, but also shortly before the application of the coatings, using two-component mixing apparatus of the type conventionally used in coatings technology. Component A) preferably contains the auxiliary agents and additives, if used, and is mixed with the component B) shortly before the application of the coatings.

The coating compositions to be produced and used according to the invention may also be applied by other methods, for example, by brush coating, roller application or application with coating knives.

The coatings are generally dried and hardened under normal temperature conditions, i.e., without heating of the coatings. However, the binder compositions according to the invention are also suitable for the preparation of stoving lacquers which are hardened at temperatures of 40° to 250° C., preferably 60 to 180° C., after their application. The substrates to which they may be applied include heat resistant materials such as plastics; woods and wood products; metals such as iron, aluminum, zinc and zinc coated steel; and mineral substrates. The possibility of curing at elevated temperatures renders the products particularly suitable for use in series coating or conveyor belt coating.

All parts and percentages in the following examples are by weight unless otherwise indicated.

EXAMPLES

Starting Materials

Preparation of Polyester Precursors aI) to aIV)

aI) 297 g of isomonomeric acid, 1134 g of isophthalic acid, 1010 g of phthalic acid anhydride, 929 g of pentaerythritol, 727 g of 1,4-dimethylolcyclohexane and 806 g of 1,6-hexanediol were weighed into a 6 liter reaction vessel equipped with stirrer, cooling and heating device and water separator and the reaction mixture was heated to 140° C. in the course of one hour while a stream of nitrogen was passed through. It was then heated to 150° C. in 3 hours and to 220° C. in a further 7 hours. Condensation with elimination of water was continued until polyester aI) had a total acid number of 2.9 and an OH number of 270.

aII) 1348 g of hexahydrophthalic acid anhydride, 1757 g of trimethylolpropane and 1673 g of a saturated C14/C16 fatty acid mixture (Prifrac 2950, Unichema International) were weighed into a 6 liter reaction vessel equipped with stirrer, cooling and heating device and water separator and the reaction mixture was heated to 140° C. in the course of one hour while a stream of nitrogen was passed through and then to 220° C. in eight hours. Condensation with elimination of water was continued until polyester aII) had a total acid number of 2.0 and an OH number of 185.

aIII) 1341 g of hexahydrophthalic acid anhydride, 875 g of trimethylol propane, 1658 g of the saturated fatty acid mixture used to prepare polyester precursor aII) and 888 g of pentaerythritol were weighed into a 6 liter reaction vessel equipped with stirrer, cooling and heating device and water separator and the reaction mixture was heated to 140° C. in one hour while nitrogen was passed through and then to 220° C. in 8 hours. Condensation with elimination of water was continued until polyester aIII) had a total acid number of 3.1 and an OH number of 270.

aIV) 1481 g of trimethylol propane, 5226 g of 1,6-hexanediol, 819 g of phthalic acid anhydride, 1615 g of adipic acid and 4595 g of isophthalic acid were weighed into a 15 liter reaction vessel equipped with stirrer, cooling and heating device and water separator and the reaction mixture was heated to 250° C. in 7 hours while a stream of nitrogen was passed through. Condensation with elimination of water was continued until polyester aIV) had a total acid number of 1.2 and an OH number of 152.

Preparation of polyester resins $A_1$) to $A_7$)

$A_1$) 1020 g of polyester precursor aI), 87 g of dimethylolpropionic acid and 2000 g of anhydrous acetone were weighed into a 5 liter reaction vessel equipped with stirrer and heating and cooling device, heated to 58° C. and homogenized. 1.5 g of tin(II)octoate were then added, followed by 280 g of isophorone diisocyanate. The reaction mixture was stirred under reflux until the NCO content was less than 0.05%.

31 g of ammonia (30% in water) and 1564 g of water were then added together. The acetone was then completely distilled off under vacuum (25 to 100 mbar, bath temperature 40° to 60° C.) and the residue was adjusted to a solids content of about 32.2% by the addition of water. Polyester resin $A_1$) contained urethane, carboxylate and hydroxyl groups and had a hydroxyl number of about 130, an acid number of about 29 and a urethane group content of about 10.7% by weight. The degree of neutralization was about 80% and the viscosity was about 500 mPa.s at 23° C.

$A_2$) 1118 g of polyester precursor aII), 67.5 g of dimethylol propionic acid and 22.5 g of neopentylglycol in 1227 g of acetone were reacted with a mixture of 180 g of isophorone diisocyanate and 112.5 g of hexamethylene diisocyanate in the presence of 1.9 g of tin (II)octoate as described for the preparation of $A_1$). 14.1 g of ammonia (30%) and 1750 g of demineralized water were then added and the acetone was distilled off. The resulting polyester resin $A_2$ contained urethane, carboxylate and hydroxyl groups and had a hydroxyl number of about 85, an acid number of about 22 and a urethane group content of about 11.5% by weight. The degree of neutralization was about 50%, the viscosity about 200 mPa.s at 23° C. and the solids content about 46%. $A_3$) 1014 g of polyester precursor aIII), 85.4 g of dimethylol propionic acid and 301 g of isophorone diisocyanate were reacted together in 2000 g of acetone in the presence of 1.5 g of tin(II)octoate as described for the preparation of $A_1$). 10 g of ammonia (30%), 10 g of dimethylethanolamine and 1500 g of water were then added and the acetone was distilled off.

Polyester resin $A_3$) contained urethane, carboxylate and hydroxyl groups and had a hydroxyl number of about 120, an acid number of about 28 and a urethane group content of about 11.5% by weight. The degree of neutralization was about 40%, the viscosity was about 200 mPa.s at 23° C. and the solids content was about 44% by weight.

$A_4$) 3000 g of polyester precursor aII), 259 g of dimethylol propionic acid, 609 g of diethyleneglycol dimethylether and 2 g of tin(II)octoate were introduced under a nitrogen atmosphere into a 12 liter reaction vessel equipped with stirrer and cooling and heating device, and the mixture was heated to 135° C. and homogenized for one hour. After the reaction mixture had cooled to 110° C., 813 g of isophorone diisocyanate were introduced in the course of 15 minutes and the reaction mixture was reacted at 130° C. until no more free isocyanate groups were detected. 40.7 g of ethoxylated nonylphenol (Emulsifier NP 20, Bayer AG) were then added and the mixture was homogenized for 15 minutes. The resin melt obtained was then dispersed in a mixture, heated to 50° C., of 4995 g of water and 91 g of dimethylethanolamine. Mixing was carried out at a temperature of about 65° C. and the product was filtered after 2 hours. Polyester resin $A_4$) contained urethane, carboxylate and hydroxyl groups and had a hydroxyl number of about 90, an acid number of about 31 and a urethane group content of about 10.5% by weight. The degree of neutralization was about 55%, the viscosity was about 500 mPa.s at 23° C. and the solids content was about 40%.

$A_5$) 1001 g of polyester precursor aII) and 84 g of dimethylol propionic acid in 2000 g of acetone were reacted with 315 g of isophorone diisocyanate in the presence of 1.5 g of tin(II)octoate as described for the preparation of $A_1$). 21.5 g of ammonia (30%) and 1600 g of demineralized water were then added and the acetone was distilled off.

Polyester resin $A_5$) contained urethane, carboxylate and hydroxyl groups and had a hydroxyl number of about 70, an acid number of about 29 and a urethane group content of about 12.0% by weight. The degree of neutralization was about 70%, the viscosity was about 1600 mPa.s at 23° C., and the solids content was about 47.6%.

A$_6$) 1140 g of polyester precursor aII) and 75 g of dimethylol propionic acid in 1227 g of acetone were reacted with a mixture of 150 g of isophorone diisocyanate and 135 g of an isocyanurate group-containing polyisocyanate (prepared from hexamethylene diisocyanate and having an isocyanate content of about 21.5%) in the presence of about 1.9 g of tin(II)octoate as described for the preparation of A$_1$). 14.5 g of ammonia (30%) and 1830 g of demineralized water were then added and the acetone was distilled off. Polyester resin A$_6$) contained urethane, carboxylate and hydroxyl groups and had a hydroxyl number of about 105, an acid number of about 24 and a urethane group content of about 8.1% by weight. The degree of neutralization was about 50%, the viscosity was about 100 mPa.s at 23° C. and the solids content was about 40%.

A$_7$) 1170 g of polyester precursor aIV) and 60 g of dimethylol propionic acid in 1227 g of acetone were reacted with 270 g of bis-(4-isocyanatocyclohexyl)-methane in the presence of 1.9 g of tin(II)octoate as described for the preparation of A$_1$). 11.5 g of ammonia (30%) and 1830 g of demineralized water were then added and the acetone was distilled off. Polyester resin A$_7$) contained urethane, carboxylate and hydroxyl groups and had a hydroxyl number of about 80, an acid number of about 19 and a urethane group content of about 7.2% by weight. The degree of neutralization was about 50%, the viscosity was about 200 mPa.s at 23° C. and the solids content was about 45%.

Polyisocyanate B)

Polyisocyanate B1)

A mixture of 70 parts by weight of uretdione group-containing polyisocyanate prepared by dimerizing hexamethylene diisocyanate and having two terminal free isocyanate groups and 30 parts by weight of N,N',N''-tris-(6-isocyanatohexyl)-isocyanurate prepared by trimerizing hexamethylene diisocyanate together with minor quantities of higher homologues of both products. In its 100% solvent free form, polyisocyanate B1) had an average viscosity of 150 mPa.s/23° C. and an average free isocyanate group content of 22.5%.

Polyisocyanate B2)

N,N',N''-tris-(6-isocyanatohexyl)-biuret together with minor quantities of its higher homologues. The 100% product had an average isocyanate content of 22.5% by weight and an average viscosity of about 3000 mPa.s/23° C.

Example 1

100 parts by weight of polyester resin A$_1$) having a solids content of 32.2% by weight in water, a viscosity of 500 mPa.s at 23° C., a pH of 7.0 and a hydroxyl number of about 130, based on the solids content, were diluted with 20.0 parts by weight of distilled water. 0.8 g of a 20% solution of a commercially available polyurethane thickener (Acrysol RM8 of Rohm and Haas, Frankfurt am Main) in 1:1 water/i-propanol mixture and 0.64 parts by weight of a commercially available emulsifier (25% solution in distilled water of an ethoxylated phenol Emulgator WN, Bayer AG) were then added. The composition obtained was suitable for use in a two-component polyurethane clear lacquer which can be diluted with water. The composition had virtually unlimited storage stability.

Polyisocyanate B1) was then added to this compositions in the following quantities to provide varying degrees of cross-linking:
a. NCO/OH=1.5:21.69 parts by weight
b. NCO/OH=2.0:28.92 parts by weight
c. NCO/OH=3.0:43.38 parts by weight and the mixtures were homogenized.

Two-component, clear polyurethane compositions which were ready for use, could be diluted with water and had the following composition were obtained:

|  | % by weight | | |
|---|---|---|---|
|  | a. | b. | c. |
| binder: | 37.66 | 40.65 | 45.86 |
| additives (solids) | 0.22 | 0.21 | 0.19 |
| total solids content: | 37.88 | 40.86 | 46.05 |
| water: | 61.90 | 58.93 | 53.76 |
| organic solvents: | 0.22 | 0.21 | 0.19 |
| total: | 100.00 | 100.00 | 100.00 |

The compositions only contained very small proportions of organic solvents, i.e., about 0.2% by weight. The gel time of the compositions was 6 to 7 hours. Films which had been applied in a wet film thickness of 200 μm (corresponding to a dry film thickness of 50 to 60 μm) dried within 4 to 6 hours at room temperature to tack free, flawless films. The hardening process of the films was entirely completed after 7 to 14 days. The properties of the compositions and the hardened films obtained therefrom are set forth in the following table:

|  | a. | b. | c. |
|---|---|---|---|
| Gelling time of the liquid lacquer | 7 h | 7 h | 7 h |
| Films hard to touch | 4–6 h | 4–6 h | 4–6 h |
| Pendulum hardness (Albert/König) | about | about | about |
| Solvent resistance |  |  |  |
| Mineral spirits: | very good | very good | very good |
| Solvent naphtha 100: | very good | very good | very good |
| Methoxypropyl acetate: | good | good | good |
| Acetone: | good-moderate | good-moderate | good-moderate |
| Ethanol: | good | good | good |

Example 2

Example 1 was repeated with the exception that the films having a wet film thickness of 200 μm produced in parallel experiments (substrate:glass plates) were stoved for 60 minutes at 80° C., 30 minutes at 120° C. and 15 minutes at 160° C., respectively. The resulting lacquer films were in all cases equal in their properties to the lacquer films from Example 1.

Example 3

100 parts by weight of polyester resin A$_5$) having a solids content of 47.6% by weight in water, a viscosity of 1600 mPa.s at 23° C., a pH of 7.2 and a hydroxyl number of about 70, based on the solids content, were mixed with 1.19 parts by weight of the thickener solution from Example 1 and 0.95 parts by weight of the emulsifier solution from Example 1. The composition was then diluted with 20 parts by weight of distilled water. A water dilutable polyhydroxyl component suitable for cross-linking with polyisocyanates and having a excellent storage stability was obtained.

A water dilutable two-component, clear polyurethane composition having the following composition was obtained after the addition of 31.35 parts by weight of a 75% solution of polyisocyanate B2) in a 1:1 mixture methoxypropylacetate and xylene:

| Composition: | |
|---|---|
| binder content: | 46.14% by weight |
| auxiliary agent: | 0.48% by weight |
| total solids content | 46.62% by weight |
| organic solvents: | 5.42% by weight |
| water: | 47.96% by weight |
| total: | 100.00% by weight. |

The composition contained 5.42% by weight of organic solvents. The equivalent ratio of NCO/OH groups was 2. The gel time of the composition was 4 to 5 hours. Films applied in a wet film thickness of 200 μm (corresponding to a dry film thickness of from 50 to 60 μm) dried within 3 to 4 hours to a tack free and flawless film. The hardening process was entirely completed after 7 to 14 days. The hardened film then had the following properties:

| pendulum hardness: | about 150-170 sec |
|---|---|
| solvent resistance: | |
| *mineral spirits: | very good |
| solvent naphtha | very good |
| methoxypropyl acetate: | good |
| acetone: | good |
| ethanol: | good |

Example 4

100 parts by weight of polyester resin $A_3$) having a solids content of 44% by weight in water, a viscosity of 200 mPa.s at 23° C., a pH of 7.0 and a hydroxyl content of 3.6%, based on the solids content, were diluted with 28 parts by weight of distilled water.

1.10 parts by weight of the 20% thickener solution from Example 1 and 0.88 parts by weight of the 25% emulsifier solution from Example 1 were then added and uniformly blended by stirring. The composition obtained was suitable for reaction with polyisocyanates to produce a water dilutable two-component polyurethane composition having excellent storage stability.

After the addition of 29.71 parts by weight of polyisocyanate B1), a water dilutable two-component polyurethane composition having the following composition was obtained:

| binder content: | 46.20% by weight |
|---|---|
| additives: | 0.27% by weight |
| total solids content: | 46.49% by weight |
| water: | 53.23% by weight |
| organic solvents: | 0.28% by weight |
| total: | 100.00% by weight |

The composition contained 0.28% by weight of organic solvents. The equivalent ratio of NCO/OH groups was 2. The gel time of the composition 6 to 7 hours.

Films which were applied by knife coating in a wet film thickness of 200 μm (corresponding to a dry film thickness of from 50 to 60 μm) dried within 4 to 5 hours to a tack free and flawless film. The hardening process was entirely completed after 7 to 14 days. The hardened film then had the following properties:

| pendulum hardness: | about 160 sec |
|---|---|
| solvent resistance: | |
| mineral spirits: | very good |
| solvent naphtha 100%: | very good |
| methoxypropyl acetate: | very good |
| acetone: | good |
| ethanol: | good |

Example 5

100 parts by weight of polyester resin $A_4$) having a solids content of 40% by weight in a 53/6/1 mixture of water, diethyleneglycol-dimethylether and diethylethanolamine, a viscosity of 500 mPa.s at 23° C., a pH of 7.0 and a hydroxyl number of about 90, based on the solids content of the preparation, were diluted with 8.3 parts by weight of distilled water. 0.83 parts by weight of the emulsifier solution from Example 1 and 0.34 parts by weight of the thickener solution from Example 1 were then added and the reaction mixture was stirred. 54.8 parts by weight of a rutile titanium dioxide (Bayertitan R-KB-4 of Bayer AG, Leverkusen) were then added and blended by stirring. The composition was then dispersed by means of a high speed stirrer having a dispersing disc rotating at 15 to 20 m/sec. A pigmented composition suitable for cross-linking with polyisocyanates was obtained. The composition was water dilutable and had excellent storage stability. After 27.02 parts by weight of polyisocyanate B1) at 100% solids was added and blended by stirring, a water dilutable, white pigmented, two-component polyurethane composition having the following composition was obtained:

| binder content: | 35.10% by weight |
|---|---|
| additive: | 0.11% by weight |
| pigment: | 28.70% by weight |
| total solids content: | 63.91% by weight |
| water: | 32.26% by weight |
| organic solvents: | 3.83% by weight |
| | 100.00% by weight |

The composition contained 3.83% by weight of organic solvents. The equivalent ratio of NCO/OH groups was 2. The gel time of composition was 6 to 8 hours.

Films applied in a wet film thickness of 200 μm (corresponding to a dry film thickness of about 60 μm) dried overnight to tack free films. The hardening process was entirely completed after 7 to 14 days and the hardened white lacquer film then had the following properties:

| gloss (Gardner 60° C.): | 80-85 |
|---|---|
| pendulum hardness (Albert/König): | about 150 sec |
| solvent resistance: | |
| mineral spirits: | very good |
| solvent naphtha 100: | very good |
| methoxypropyl acetate: | very good |
| acetone: | good to moderate |
| ethanol: | good to moderate |

Example 6

Example 5 was repeated with the exception that the films having a wet film thickness of 200 μm produced in parallel experiments were stoved for 60 minutes at 80°

C., 30 minutes at 120° C. and 15 minutes at 160° C., respectively. The resulting lacquer films were in all cases equal in their properties to the lacquer films from Example 5.

Examples 7 to 9

Polyisocyanate B1 was mixed with the following products:

| | |
|---|---|
| A$_2$ | (Example 7) |
| A$_6$ | (Example 8) |
| A$_7$ | (Example 9) | to produce water dilutable two-component polyurethane compositions using the procedure set forth in Example 1. The NCO/OH equivalent ratio was 1.2:1. The compositions had pot lives of 5 to 8 hours and films applied in a wet film thickness of 150 μm (30–40 μm dry film thickness) dried to a tack free finish after 3 to 5 hours.

The coatings were subjected to an MIBK rubbing test after 7 days drying at room temperature. In this test 100 double rubs were carried out with a wad of cotton wool impregnated with MIBK. No changes were found in any of the three films.

When tested for resistance to water by applying a wad of cotton wool soaked in water to the hardened films, the films remained unchanged after 48 hours.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous binder composition for the manufacture of an aqueous coating composition which may be cured by an isocyanate addition on a coated substrate comprising
   A) an aqueous solution or dispersion of an organic polyol component which can be diluted with water and comprises at least one polyester resin containing urethane, carboxylate and hydroxyl groups and
   B) a hydrophobic polyisocyanate component which has a viscosity of 50 to 10.000 mPa.s at 23° C. and contains at least one organic polyisocyanate which is present as an emulsion in component A),
wherein the NCO/OH equivalent ratio, based on the isocyanate groups of component B) and the hydroxyl groups of the polyol component present in A), is 0.5:1 to 5:1.

2. The aqueous binder composition of claim 1 wherein
   i) said polyester resin of binder component A) has a weight average molecular weight M$_w$ of 3000 to 100,000, a hydroxyl number of 20 to 240 mg KOH/g, an acid number, based on the all of the carboxyl groups, of 10 to 45 mg KOH/g, and a urethane group content of 2.5 to 15.0% by weight,
   ii) the hydroxyl number, the acid number and the urethane group content being based on solids,
   iii) 25 to 100% of the carboxyl groups of said polyester resin being in carboxylate form and
   iv) component A) being present as a 15 to 65% by weight aqueous solution having a viscosity at 23° C. of 10 to 30,000 mPa.s and a pH of 5 to 10.

3. The aqueous binder composition of claim 1 wherein said polyester resin of binder component A) comprises the reaction product of
   a) 65 to 92% by weight of a polyester polyol having a hydroxyl number of 50 to 500 and an acid number ≦6,
   b) 0 to 7% by weight of a diol having a molecular weight of 62 to 240,
   c) 2.5 to 7.5% by weight of a 2,2-bis-(hydroxymethyl)-alkane carboxylic acid which may be present in tertiary amine salt form and
   d) 8 to 30% by weight of at least one at least one polyisocyanate having two or more isocyanate groups and having a molecular weight of 166 to 2000,
wherein the percentages of a) to d) add up to 100%, based on the weight of a) to d).

4. The aqueous binder composition of claim 2 wherein said polyester resin of binder component A) comprises the reaction product of
   a) 65 to 92% by weight of a polyester polyol having a hydroxyl number of 50 to 500 and an acid number ≦6,
   b) 0 to 7% by weight of a diol having a molecular weight of 62 to 240,
   c) 2.5 to 7.5% by weight of a 2,2-bis-(hydroxymethyl)-alkane carboxylic acid which may be present in tertiary amine salt form and
   d) 8 to 30% by weight of at least one at least one polyisocyanate having two or more isocyanate groups and having a molecular weight of 166 to 2000,
wherein the percentages of a) to d) add up to 100%, based on the weight of a) to d).

5. The aqueous binder composition of claim 3 wherein polyester polyol a) comprises the reaction product of
   a$_1$) 0 to 60% by weight of a monocarboxylic acid having 6 to 22 carbon atoms,
   a$_2$) 10 to 65% by weight of di- and/or tricarboxylic acids or their anhydrides,
   a$_3$) 15 to 70% by weight of di- and/or higher functional alcohols,
   a$_4$) 0 to 30% by weight of monohydric alcohols
   a$_5$) 0 to 15% by weight of hydroxycarboxylic acids, lactones, aminoalcohols and/or aminocarboxylic acids,
wherein the percentages of a$_1$) to a$_5$) add up to 100%, based on the weight of a$_1$) to a$_5$).

6. The aqueous binder composition of claim 4 wherein polyester polyol a) comprises the reaction product of
   a$_1$) 0 to 60% by weight of a monocarboxylic acid having 6 to 22 carbon atoms,
   a$_2$) 10 to 65% by weight of di- and/or tricarboxylic acids or their anhydrides,
   a$_3$) 15 to 70% by weight of di- and/or higher functional alcohols,
   a$_4$) 0 to 30% by weight of monohydric alcohols
   a$_5$) 0 to 15% by weight of hydroxycarboxylic acids, lactones, aminoalcohols and/or aminocarboxylic acids,
wherein the percentages of a$_1$) to a$_5$) add up to 100%, based on the weight of a$_1$) to a$_5$).

7. The aqueous binder composition of claim 1 wherein
   i) said polyester resin of component A) has a weight average molecular weight (M$_w$) of 6000 to 50 000, a hydroxyl number of 45 to 190 mg KOH/g, an acid number of 14 to 33 mg KOH/g and a urethane group content of 5.0 to 12.5% by weight, ii) the hydroxyl number, the acid number and the urethane group content being based on solids, iii) 40 to 100% of the carboxyl groups of said polyester resin being in carboxylate form, iv) component A) being present as a 25 to 55% by weight aqueous solution having a viscosity at 23° C. of 50 to 10,000 mPa.s and a pH of 6 to 9 and v) polyisocyanate component B) comprises at least one organic polyisocyanate having exclusively (cyclo)aliphatically bound isocyanate groups.

8. The aqueous binder composition of claim 1 wherein said polyester resin of binder component A) comprises the reaction product of a) 70 to 87% by weight of a polyester polyol having a hydroxyl number of 80 to 350 and an acid number $\leq 4$, b) 0 to 3% by weight of a diol having a molecular weight of 62 to 240, c) 3.0 to 6.5% by weight of dimethylolpropionic acid which may be present in tertiary amine salt form and d) 10 to 23% by weight of at least one at least one polyisocyanate having two or more isocyanate groups and having a molecular weight of 166 to 2000, wherein the percentages of a) to d) add up to 100%, based on the weight of a) to d).

9. The aqueous binder composition of claim 8 wherein polyester polyol a) comprises the reaction product of $a_1$) 0 to 55% by weight of a monocarboxylic acid having 7 to 20 carbon atoms, $a_2$) 13 to 56% by weight of di- and/or tricarboxylic acids or their anhydrides, $a_3$) 25 to 63% by weight of di- and/or higher functional alcohols, wherein the percentages of $a_1$) to $a_3$) add up to 100%, based on the weight of $a_1$) to $a_3$).

10. A process for the preparation of a coating composition containing an aqueous binder composition and optionally auxiliary agents or additives which comprises i) emulsifying a hydrophobic polyisocyanate component having a viscosity at 23° C. of 50 to 10,000 mPa.s and containing at least one organic polyisocyanate in an aqueous solution or dispersion of a polyester resin containing urethane, carboxylate and hydroxyl groups in an amount sufficient to provide an NCO/OH equivalent ratio, based on the isocyanate groups of the polyisocyanate component and the hydroxyl groups of the polyester resin, of 0.5:1 to 5:1, and ii) incorporating the optional auxiliary agents and additives in the polyester resin solution or dispersion containing urethane, carboxylate and hydroxyl groups before the addition of the polyisocyanate component.

11. The process of claim 10 wherein said polyester resin contains urethane, carboxylate and hydroxyl groups, has a weight average molecular weight ($M_{\overline{w}}$) of 3000 to 100,000, a hydroxyl number of 20 to 240, an acid number of 10 to 45 and a urethane group content of 2.5 to 15.0% by weight, and is prepared by reacting a) 65 to 92% by weight of a polyester polyol having a hydroxyl number of 50 to 500 and an acid number $\leq 6$, b) 0 to 7% by weight of a diol having a molecular weight of 62 to 240, c) 2.5 to 7.5% by weight of a 2,2-bis-(hydroxymethyl)-alkane carboxylic acid which may be present in tertiary amine salt form and d) 8 to 30% by weight of at least one polyisocyanate containing two or more isocyanate groups and having a molecular weight of 168 to 2000, at 40° to 140° C. in a 40 to 99% by weight organic solution, dissolving or dispersing the resulting polyester resin, and converting 25 to 100% of the carboxyl groups present into carboxylate groups by neutralization before and/or during dissolving or dispersing the polyester resin in water.

12. A process for coating a substrate which comprises i) applying to said substrate a coating composition containing an aqueous binder composition A) an aqueous solution or dispersion of an organic polyol component which can be diluted with water and comprises at least one polyester resin containing urethane, carboxylate and hydroxyl groups and B) a hydrophobic polyisocyanate component which has a viscosity of 50 to 10,000 mPa.s at 23° C. and contains at least one organic polyisocyanate which is present as an emulsion in component A), wherein the NCO/OH equivalent ratio, based on the isocyanate groups of component B) and the hydroxyl groups of the polyol component present in A), is 0.5:1 to 5:1, and ii) allowing components A) and B) to react by an isocyanate addition reaction after being applied to said substrate.

13. The process of claim 12 wherein said coating is cured at a temperature of 40° to 250° C.

14. The process of claim 12 wherein said coating is cured at a temperature of 80° to 160° C.

15. The process of claim 12 wherein i) said polyester resin of binder component A) has a weight average molecular weight $M_w$ of 3000 to 100,000, a hydroxyl number of 20 to 240 mg KOH/g, an acid number, based on all of the carboxyl groups, of 10 to 45 mg KOH/g, and a urethane group content of 2.5 to 15.0% by weight, ii) the hydroxyl number, the acid number and the urethane group content being based on solids, iii) 25 to 100% of the carboxyl groups of said polyester resin being in carboxylate form and iv) component A) being present as a 15 to 65% by weight aqueous solution having a viscosity at 23° C. of 10 to 30,000 mPa.s and a pH of 5 to 10.

16. The process of claim 12 wherein said polyester resin of binder component A) comprises the reaction product of a) 65 to 92% by weight of a polyester polyol having a hydroxyl number of 50 to 500 and an acid number $\leq 6$, b) 0 to 7% by weight of a diol having a molecular weight of 62 to 240, c) 2.5 to 7.5% by weight of a 2,2-bis-(hydroxymethyl)-alkane carboxylic acid which may be present in tertiary amine salt form and d) 8 to 30% by weight of at least one polyisocyanate having two or more isocyanate groups and having a molecular weight of 166 to 2000, wherein the percentages of a) to d) add up to 100%, based on the weight of a) to d).

17. The process of claim 15 wherein said polyester resin of binder component A) comprises the reaction product of
   a) 65 to 92% by weight of a polyester polyol having a hydroxyl number of 50 to 500 and an acid number $\leq 6$,
   b) 0 to 7% by weight of a diol having a molecular weight of 62 to 240,
   c) 2.5 to 7.5% by weight of a 2,2-bis-(hydroxymethyl)-alkane carboxylic acid which may be present in tertiary amine salt form and
   d) 8 to 30% by weight of at least one polyisocyanate having two or more isocyanate groups and having a molecular weight of 166 to 2000, wherein the percentages of a) to d) add up to 100%, based on the weight of a) to d).

18. The process of claim 16 wherein polyester polyol a) comprises the reaction product of
   $a_1$) 0 to 60% by weight of a monocarboxylic acid having 6 to 22 carbon atoms,
   $a_2$) 10 to 65% by weight of di- and/or tricarboxylic acids or their anhydrides,
   $a_3$) 15 to 70% by weight of di- and/or higher functional alcohols,
   $a_4$) 0 to 30% by weight of monohydric alcohols
   $a_5$) 0 to 15% by weight of hydroxycarboxylic acids, lactones, aminoalcohols and/or aminocarboxylic acids, wherein the percentages of $a_1$) to $a_5$) add up to 100%, based on the weight of $a_1$) to $a_5$).

19. The process of claim 17 wherein polyester polyol a) comprises the reaction product of
   $a_1$) 0 to 60% by weight of a monocarboxylic acid having 6 to 22 carbon atoms,
   $a_2$) 10 to 65% by weight of di- and/or tricarboxylic acids or their anhydrides,
   $a_3$) 15 to 70% by weight of di- and/or higher functional alcohols,
   $a_4$) 0 to 30% by weight of monohydric alcohols
   $a_5$) 0 to 15% by weight of hydroxycarboxylic acids, lactones, aminoalcohols and/or aminocarboxylic acids, wherein the percentages of $a_1$) to $a_5$) add up to 100%, based on the weight of $a_1$) to $a_5$).

20. The process of claim 12 wherein
   i) said polyester resin of component A) has a weight average molecular weight ($M_w$) of 6000 to 50,000, a hydroxyl number of 45 to 190 mg KOH/g, an acid number of 14 to 33 mg KOH/g and a urethane group content of 5.0 to 12.5% by weight,
   ii) the hydroxyl number, the acid number and the urethane group content being based on solids,
   iii) 40 to 100% of the carboxyl groups of said polyester resin being in carboxylate form,
   iv) component A) being present as a 25 to 55% by weight aqueous solution having a viscosity at 23° C. of 50 to 10,000 mPa.s and a pH of 6 to 9 and
   v) polyisocyanate component B) comprises at least one organic polyisocyanate having exclusively (cyclo)aliphatically bound isocyanate groups.

21. The process of claim 12 wherein said polyester resin of binder component A) comprises the reaction product of
   a) 70 to 87% by weight of a polyester polyol having a hydroxyl number of 80 to 350 and an acid number $\leq 4$,
   b) 0 to 3% by weight of a diol having a molecular weight of 62 to 240,
   c) 3.0 to 6.5% by weight of dimethylolpropionic acid which may be present in tertiary amine salt form and
   d) 10 to 23% by weight of at least one polyisocyanate having two or more isocyanate groups and having a molecular weight of 166 to 2000, wherein the percentages of a) to d) add up to 100%, based on the weight of a) to d).

22. The process of claim 21 wherein polyester polyol a) comprises the reaction product of
   $a_1$) 0 to 55% by weight of a monocarboxylic acid having 7 to 20 carbon atoms,
   $a_2$) 13 to 56% by weight of di- and/or tricarboxylic acids or their anhydrides,
   $a_3$) 25 to 63% by weight of di- and/or higher functional alcohols, wherein the percentages of $a_1$) to $a_3$) add up to 100%, based on the weight of $a_1$) to $a_3$).

* * * * *